Patented Oct. 11, 1932

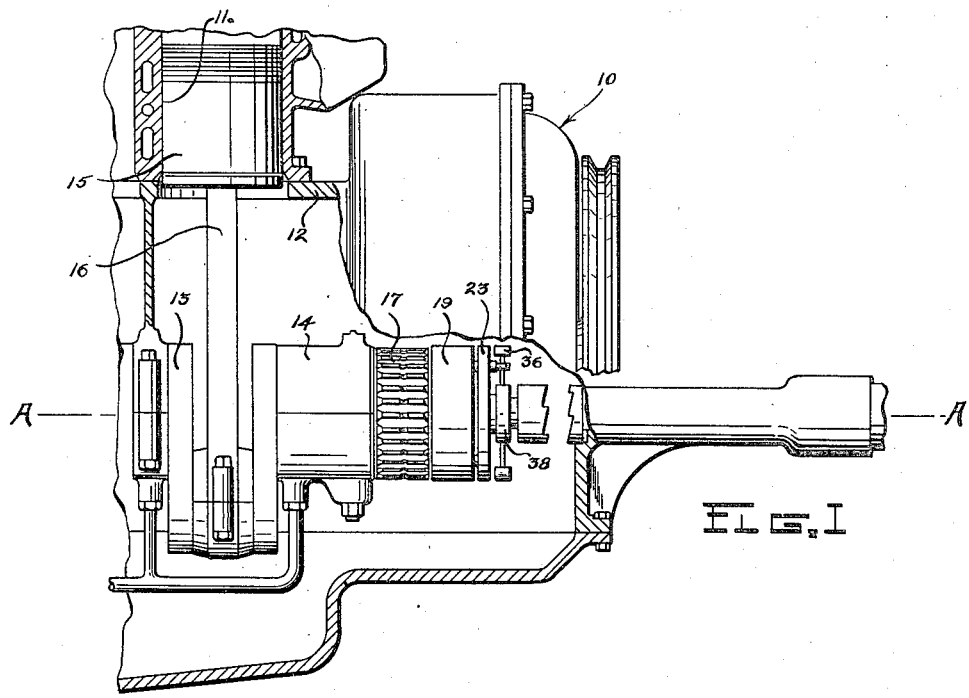
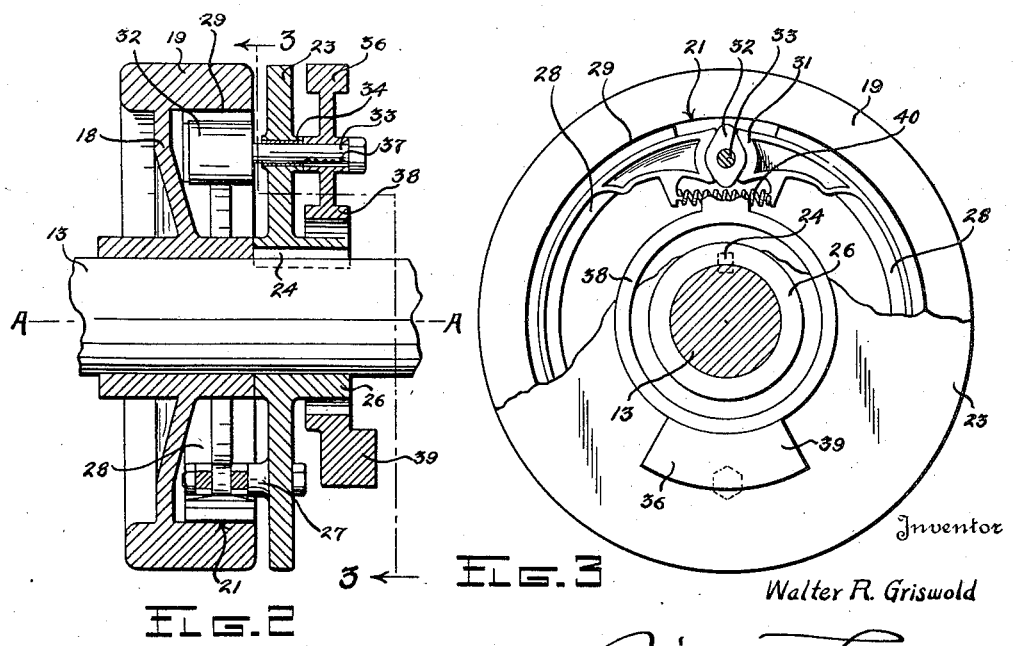

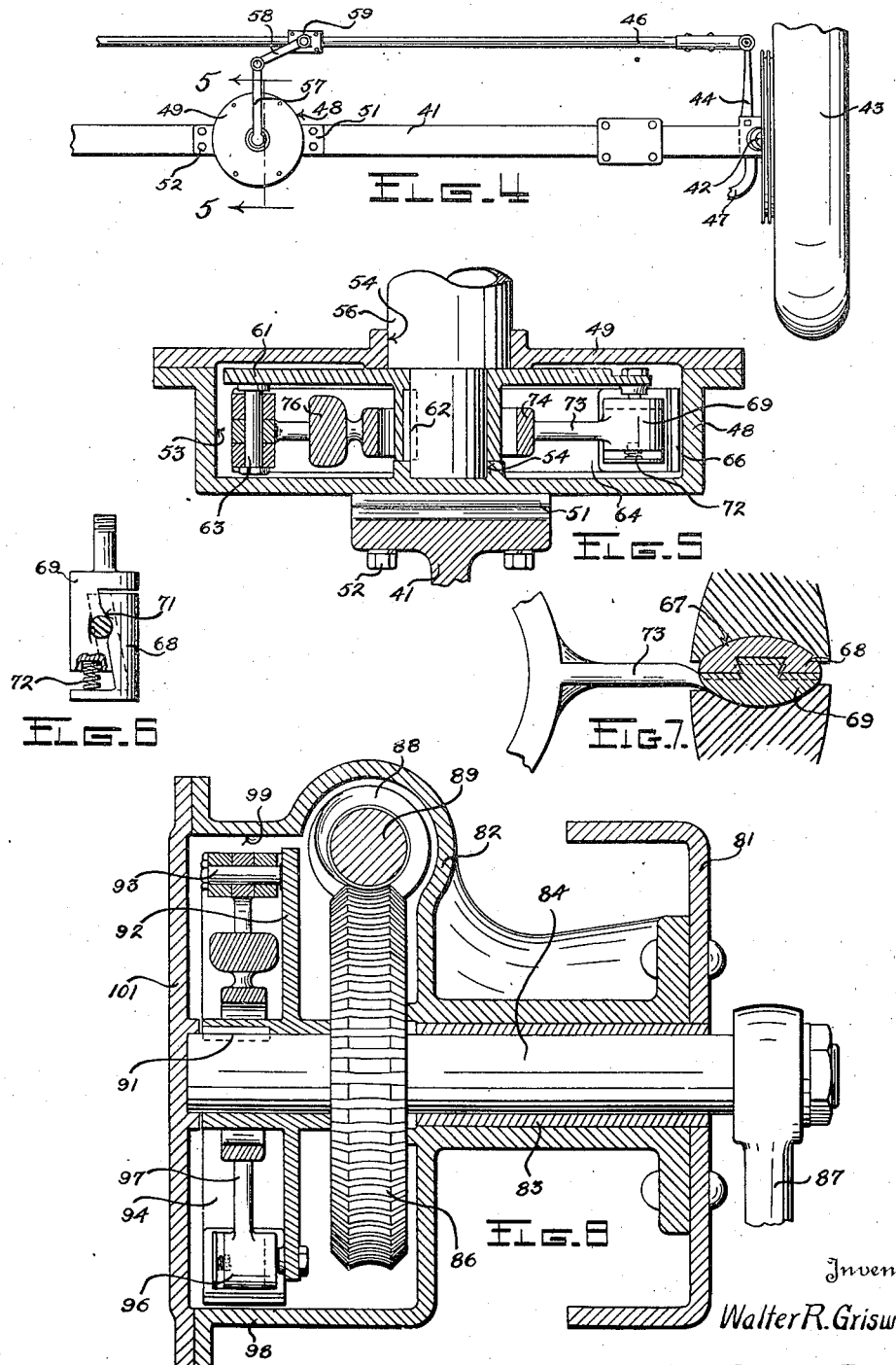

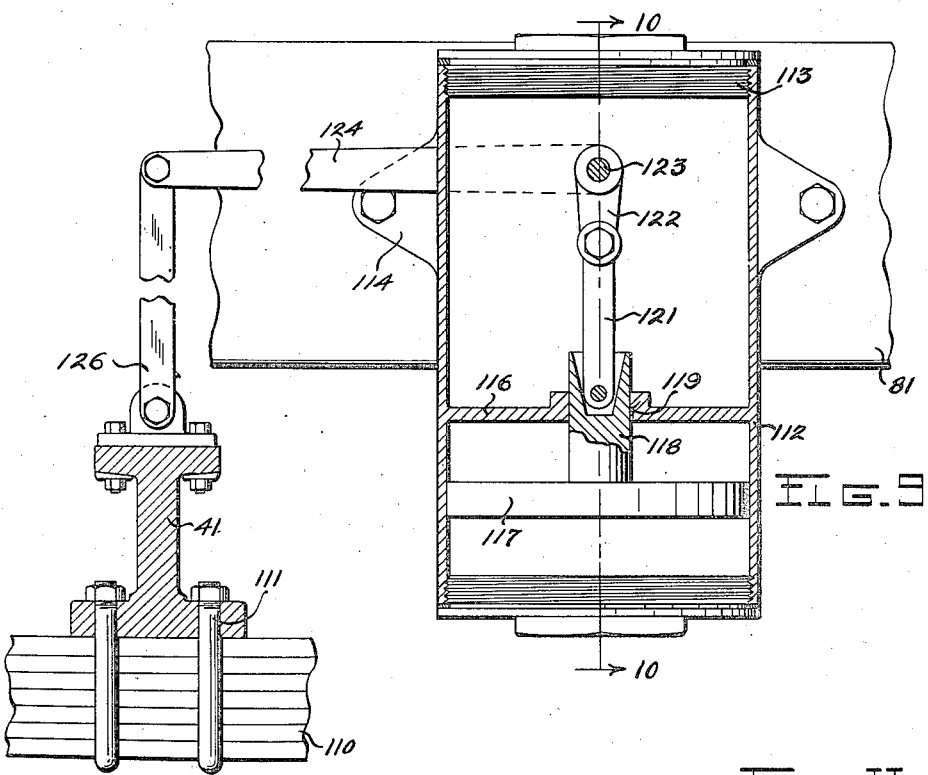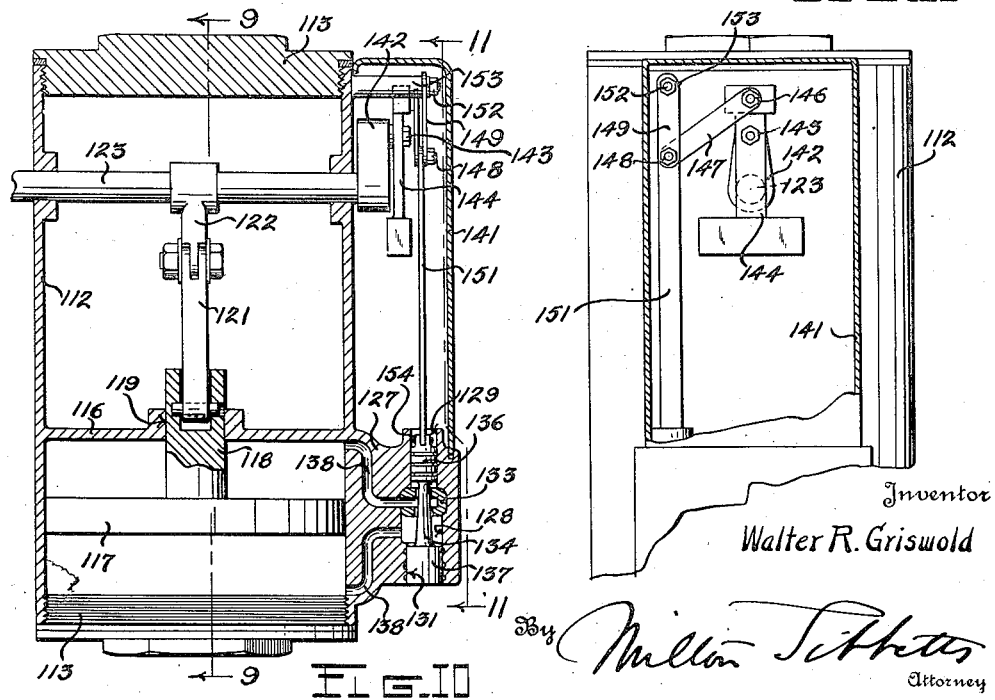

1,882,280

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

DAMPING DEVICE

Application filed June 27, 1925. Serial No. 39,896.

This invention relates to damping devices and particularly to apparatus such as is used for the absorption of alternate acceleration and retardation in a rotating body, which movements constitute a torsional vibration therein.

It has for its principal object to provide apparatus of the character designated, in which the damping effect shall be proportional to the torsional disturbance in the body.

Another object of the invention is to provide damping apparatus which shall be sensitive to vibratory disturbances of high frequency.

Another object of the invention is to provide damping apparatus which shall prevent the building up of conditions of vibratory resonance by the moving body and adjacent members.

Other objects of the invention will appear from the following description taken in connection with the drawings, which form a part of this specification and in which:

Fig. 1 is a view in side elevation, partially in section and partially broken away, of the front portion of an engine, showing the application of the invention to the crank shaft thereof;

Fig. 2 is an enlarged sectional detail view of the apparatus shown in Fig. 1;

Fig. 3 is an end view of the device, partially broken away, and partially in section substantially on the line 3—3 of Fig. 2;

Fig. 4 is a plan view of the front axle and steering wheel of a motor vehicle showing an application of the invention to the steering mechanism thereof;

Fig. 5 is an enlarged view of part of the apparatus shown in Fig. 4, in section substantially on the line 5—5 of Fig. 4;

Figs. 6 and 7 are detail views showing the construction of the expanding cam;

Fig. 8 is a transverse section through the steering gear of a motor vehicle, showing an application of the invention thereto;

Fig. 9 is a view in longitudinal, vertical section, substantially on the line 9—9 of Fig. 10, of a shock absorber constructed in accordance with this invention;

Fig. 10 is a view partially in side elevation and partially in section, substantially on the line 10—10 of Fig. 9, and Fig. 11 is a view partially in side elevation and partially in section on the line 11—11 of Fig. 10.

The phenomenon of torsional vibration in rotary and oscillatory bodies and systems of bodies, such, for example, as engine crank shafts and cam shafts, presents a problem which has received considerable study, and devices have been heretofore proposed for the absorption or damping out of movements of this nature. Apparatus of this character, for example, is disclosed in U. S. Patent No. 1,085,443, granted January 27, 1914 to Frederick William Lanchester. Such devices, however, operate to apply a constant damping or braking effect to the vibratory body, whereas it is highly desirable to produce a damping effect which is in proportion to the vibration. This invention provides means to accomplish the desired result, the damping being in proportion to the acceleration of the body. This is accomplished by absorbing from or supplying to the body an amount of energy in proportion to the positive or negative acceleration thereof, so that upon a positive acceleration energy will be taken from the body, and upon a retardation energy will be supplied thereto. The transmission of energy in either direction is under the control of inertia means carried by the body and highly sensitive to changes in the velocity thereof.

The invention is of wide application and may be applied to the damping of torsional or oscillatory vibration in any rotary or oscillatory body, it being understood that the term "rotary" as herein used includes the term "oscillatory." It has been illustrated in application to the crank shafts of internal combustion engines, to the steering apparatus of motor vehicles, and to vehicle spring dampeners, but it is not to be considered as limited to such apparatus.

Referring to the drawings, at 10 is shown an internal combustion engine of the usual type having cylinders 11 mounted on a crank case 12, in which a crank shaft 13 is journaled for rotation in bearings 14, in the well known manner. Pistons 15 are mounted to reciprocate in the cylinders 11 and are connected to the cranks of the crank shaft 13 by connecting rods 16. Forwardly of the bearing 14, the shaft 13 is provided with a chain sprocket 17, or equivalent gearing, by which the cam shaft and various other accessories (not shown) are driven in timed relation thereto. Forwardly of the sprocket 17 a damping member 18 is mounted on the shaft 13, which member is preferably in the form of a fly wheel mounted independently of the shaft 13 and rotatable about the axis AA thereof. The flywheel 18 is journaled on the shaft 13 with sufficient closeness to prevent chatter, and has an axially disposed rim 19, the mass of which is sufficient to insure that the flywheel rotate with a substantially constant velocity over short periods of time. The inner face of the fly wheel rim 19 of the fly wheel is finished as at 21 to form a clutch drum.

Forwardly of the fly wheel 18 is mounted a disk or plate 23, keyed or otherwise rigidly secured to the shaft 13, as at 24, to insure rotation therewith. The hub portion 26 of the disk 23 may co-operate with the hub of the sprocket 17 to position the fly wheel 18, and prevent axial shifting thereof. Suitably mounted in the plate 23 is a pin 27 on which a pair of clutch members or shoes 28 are pivotally mounted in a familiar manner. The shoes 28 are provided with suitable friction lining 29, and are positioned in the plane of the flange 21 to engage therewith. The pivotal mounting of the shoes 28 on the pin 27 may be made adjustable, if desired, in any well known manner, to provide adjustment of the clearance between the shoes 28 and the co-operating drum 21.

The other ends of the clutch shoes 28 are formed with cam followers or abutments 31, adapted to co-operate with a cam 32 by means of which the shoes 28 are expanded about their pivot 27 to engage the friction lining 29 with the drum 21, in a manner well understood in the art to which this invention relates. The cam 32 is rigidly mounted on a suitable cam shaft 33, journaled, as in a bushing 34, in the plate 23 opposite the pin 27, and this shaft 33 extends on each side of the plate 23 axially of the engine crank shaft 13. The rearwardly disposed end of the shaft 33 extends under the overhanging face 21 of the clutch drum, and supports the cam 32 in the manner described, while the forwardly disposed end of this shaft is adapted to support an inertia member or pendulum 36. The pendulum or other weight member, is keyed to the shaft 33, as at 37, and has an enlarged portion 38 adapted to extend around the crank shaft 13. The free end of the pendulum 36 is provided with a weight 39, and the pendulum is so designed that its center of gravity, during normal or constant speed of the device, lies upon the common axis of rotation AA of the crank shaft 13 and the fly wheel 18.

The cam contact surfaces of the abutments 31 are so designed as to take up substantially all play or back lash between these members, so that upon very slight movements of the cam shaft 33, the cam 32 will operate the shoes 28, forcing the lining 29 into engagement with the surface 21. These elements form a clutch, which operates, by expansion of the shoes 28 and the resulting engagement of the lining 29 with the drum 21, to connect the fly wheel 18 to the disk 23 in such a manner that an exchange of energy between these members is accomplished. The shoes 28 are preferably provided with a spring 40, which may be so designed as to tend to normally expand them, thus applying a constant initial brake load upon the drum 21.

The operation of this device will be readily understood. During normal or constant-speed rotation of the shaft 13, the fly wheel 18 rotates at the same speed about the axis AA, and the plate 23 being rigidly secured to the shaft 13 also rotates at the same speed, carrying the shoes and the cam, which comprise one of the clutch elements, with it. During such constant-speed rotation, the center of gravity of the pendulum member 36, which lies on the axis of rotation AA, is not disturbed. If, however, the shaft 13 undergoes an acceleration or retardation, or both, such as would be caused by torsional vibration, the inertia of the pendulum 36 will cause it to swing about its axis 33, and the amplitude of the swing will be proportional to the acceleration or retardation of the shaft. The inertia force is equal to the mass of the pendulum multiplied by its acceleration, and as the pendulum mass is constant, it follows that the force causing displacement of the pendulum is proportional to the acceleration. The pendulum 36, accordingly, turns the cam shaft 33 with a force which is proportional to the torsional disturbance in the shaft 13, and the cam 33 being turned an equal amount, will apply the shoes to the drum 21 of the fly wheel with a force which is proportional to this disturbance.

If the disturbance is a positive acceleration, the crank shaft 13 tends to overrun the constant-speed fly wheel 18. In this case, application of the clutch shoes imposes on the crank shaft 13 a drag caused by the inertia of the fly wheel 18, and this drag tends to slow down the shaft 13 to its normal speed. If the disturbance is a retardation, the crank shaft 13 tends to slow down below the speed of the fly wheel 18, and the application of the shoes causes the momentum of the fly wheel to be added to the shaft, which tends to speed it up. In either case, the damping effect will be proportional, both in direction and in degree, to the variation in speed of the shaft which constitutes the disturbance. The damping of the vibration restores the steady motion of the shaft so that the swinging motion of the pendulum 36 is stopped.

An application of the invention to the steering mechanism of a motor vehicle is illustrated in Figs. 4 to 7 of the drawings, in which 41 is the front axle of such a vehicle, provided at its ends with the usual pivotal steering connections, or knuckles 42, on which the front wheels 43 of the vehicle are mounted. Each of the knuckles 42 is provided with a steering arm 44, which arms 44 are connected by a tie rod 46, so that the wheels will be turned together in steering the vehicle. One of the knuckles is also provided with a steering arm 47 which is adapted to be actuated by the vehicle steering gear in the usual manner to turn the wheels 43 on their steering axes.

It frequently happens in the operation of modern motor vehicles, particularly, those equipped with large low-pressure tires of the balloon type, that at certain speeds of the vehicle a rapid oscillation of the wheels 43 on their pivots 42 is set up, taking the form of an oscillatory vibration of considerable amplitude. This phenomenon is destructive of various parts of the vehicle, is exceedingly uncomfortable, and increases the difficulty of steering to a point at which operation of the vehicle is quite dangerous. Such vibration has come to be known in the art as "shimmy" and will be hereinafter so referred to.

The present invention provides a device which may be used to damp "shimmying" in a vehicle steering mechanism, and absorb the energy developed in such vibration. The axle 41 is provided, intermediate its ends, with a housing 48 of cylindrical form having a removable cover plate 49, and having ears or lugs 51 by which it may be rigidly secured to the axle 41 in any suitable manner, as by the bolts 52. The inner surface of the circular side wall of the housing 48 forms a drum 53. Journaled in suitable alined bearings 54, formed in lugs in the bottom of the housing 48 and in the cover 49 respectively, is a shaft 56, the upper end of which projects through the cover 49 and is provided with an arm 57 rigidly connected thereto in any convenient manner. The end of the arm 57 is pivotally connected to a link 58, the other end of which is pivoted to a clamp 59 secured to the tie rod 46. By this mechanism, movement of the tie rod caused by the swinging of the wheels 43 on their pivots 42, is communicated to the shaft 56, which thus has an oscillatory motion corresponding to that of the pivoted wheels.

A plate 61 is mounted on the shaft 56 within the housing 48, and is rigidly secured to the shaft in any convenient manner as by the key 62. This plate 61 is provided near its periphery with a pivot pin 63 on which is mounted a pair of expanding shoes 64, similar to the shoes 28 shown in Fig. 3, and provided with friction lining 66 which is adapted to contact the drum 53 upon expansion of the shoes. Between the adjacent ends of the shoes 64 is mounted an expanding cam 67, formed of two parts 68 and 69, dove-tailed together, and provided with cooperating tapered surfaces 71 as clearly shown in Figs. 6 and 7. The cam portions 68 and 69 are urged apart in the direction of their length by a light compression spring 72 mounted between them, the tapered surfaces 71 cooperating to increase the thickness of the cam 67, as will be evident. One of the cam portions, as 69, is provided with an arm 73, which may be integral as shown, forming the shank of a pendulum, which has an enlarged central portion 74, adapted to pass around the shaft 56 and the hub of the plate 61, and which has a suitable weight 76 at its free end.

It will be apparent that the cam 67 provides a pivotal mounting for the pendulum 73 between the adjacent ends of the shoes 64, and that by reason of its expanding action, all back lash and lost motion between the cam and the ends of the shoes is taken up, so that a very slight motion of the pendulum 73 on its pivotal axis will expand the shoes, bringing the friction lining 66 into contact with the drum 53. It will also be obvious that the force with which the shoes 64 are expanded against the drum 53 is proportional to the throw of the pendulum 73, and that this throw is in turn dependent upon the acceleration of the plate 61 on which the apparatus is mounted.

Upon the commencement of a "shimmy" in the steering wheels of the vehicle, the plate 61 is given a violent oscillatory motion about the axis of the shaft 56 by means of the arm 57, link 58 and the tie rod 46. This motion causes the pendulum 73, by reason of its inertia, to swing first to one side and then to the other side of its normal neutral position, thus applying the shoes 64 to the drum 53 in each direction of the shimmying motion. The braking force thus set up opposes rotation of the shaft 56, and is in turn transmitted through the lever 57 and link 58 to the tie rod 46, so that a powerful damping effect is exerted upon the steering mechanism, which opposes the shimmy movement with a force proportional to the intensity thereof.

Another application of the invention to the damping of shimmy in vehicle wheels and their associated steering gear is shown in Fig. 8, in which 81 is the side frame member of the vehicle to which is secured the usual housing 82 for the vehicle steering gear. Journaled in appropriate bearings 83 in the housing 82 is a steering cross shaft 84, to which is keyed or otherwise rigidly secured a worm wheel 86. The shaft 84 projects from the housing through the side frame member 81 and is provided at its outer end with a steering arm 87, the lower end of which is connected to a steering arm on the axle knuckle, such as the arm 47 shown in Fig. 4, by a drag link of any suitable form (not shown). Suitably mounted in the housing 82 is a worm 88 adapted to engage and actuate the worm wheel 86, which worm is rigidly secured to and operated by the usual steering shaft 89, in a manner well known in the art to which this invention relates. It will be obvious that shimmy motion of the vehicle wheels will be transmitted through the steering mechanism to the arm 87 and thence to the shaft 84, which will thus be given a violent oscillatory motion. In steering gears as usually constructed, this motion is transmitted through the worm wheel 86, worm 88, and shaft 89 to the driver of the vehicle, and as heretofore explained, this motion not only heavily stresses the steering gear and other portions of the steering mechanism, but is acutely uncomfortable to the driver.

In the present embodiment of the invention, the shaft 84 is extended through the wheel 86 and is rigidly keyed as at 91 to a plate 92, similar to the plate 61 of Fig. 5. The plate 92 is provided with a pivotal support 93 for the shoes 94, which are similar to the shoes 64 described in connection with the embodiment of Fig. 5, and a similar cam 96 is supported between the ends of the shoes 94 and adapted to actuate them. The cam 96 is actuated by a pendulum 97, sensitive to changes in the velocity of movement of the shaft 84 to expand the shoes 94 in the manner previously described. The housing 82 is provided with a laterally extending circular flange 98, the inner surface of which forms a drum 99 adapted for co-operation with the shoes 94, to set up a braking action, the damping effect of which on the oscillatory motion of the shaft 84, is in proportion to the disturbance. The housing 82 may be closed by a suitable cover plate 101, if desired. It will also be apparent that in the application of the invention to shimmy damping devices, as shown in Figs. 4 to 8, the acceleration of the various parts of the steering gear during normal operation thereof is so low that no appreciable effect on the pendulum or inertia member is produced, so that the damper does not affect the ordinary steering action of the device in any way.

In Figs. 9 to 11 is illustrated an application of the invention to a vehicle spring dampener, which device is commonly known in the art as a shock absorber. For the purpose of illustration, the invention has been shown in a form adapted to damp the vibration of one of the front springs of a vehicle, but it is to be understood that it is equally applicable to rear springs, and that it is as applicable to transverse as it is longitudinally arranged springs.

In this device, 110 represents a portion of one of the front springs of the vehicle, which is suspended from the axle 41 therof by the U-bolts or clips 111, and which is adapted to support the vehicle frame member 81 through shackles or other suitable connections (not shown) in the well known manner. The shock absorber shown comprises a cylindrical housing 112, closed by removable heads 113 and provided with suitable ears 114 by which it is bolted or otherwise secured to the frame member 81. The housing 112 is divided transversely by a partition 116 into upper and lower chambers, and a piston 117 is slidably mounted in the lower chamber, which is filled with a suitable fluid such as oil, in fluid-tight relation to the cylindrical walls 112. This piston 117 is formed with a stem portion 118 slidably mounted in a central opening 119 in the partition 116, and projecting therethrough into the upper chamber. This stem portion is pivotally connected by means of a rod 121 to the extremity of a lever arm 122, rigidly secured to a shaft 123 which is journaled in suitable bearings transversely of the upper chamber and near the head 113. This shaft projects through the housing 112 on each side. One of its ends is provided with a lever arm 124, outside the casing 112, which is connected by a link 126 to the axle 41 of the vehicle. It will thus be evident that movements of the axle with respect to the vehicle frame, caused by compression and recoil of the vehicle spring, will be communicated through the link 126 and arm 124 to the shaft 123, causing oscillatory movement thereof, and from the shaft through the arm 122 and rod 121 to the piston 117 which is given a corresponding reciprocatory movement in the cylinder 112. It will also be evident that since these parts are connected together, the shaft 123 and the piston 117 will have, at any given movement during spring motion, a velocity and an acceleration proportional respectively to the velocity and acceleration of the spring.

The housing 112 is formed with an external lug 127 on the side thereof opposite the lever arm 124, which lug is formed with a valve chamber 128 having communicating upper and lower cylindrical bores 129 and 131. Within the chamber 128 is formed a pair of co-operating valve seats 133 for a valve member 134, which is preferably of the tapered plug type. The valve member 134 is provided at its upper and lower extremities with cylindrical guide portions 136 and 137 which are adapted to reciprocate in substantially fluid-tight engagement with the bores 129 and 131 respectively. Suitable passages 138 connect the chamber 128 with the lower chamber of the housing 112, above and below the piston 117. It will be seen that the passages 138 and the chamber 128 constitute a by-pass between the ends of the lower portion of the cylinder through which the piston 117 is adapted to travel, and that the flow of fluid through this by-pass from one end of the cylinder to the other, such as is caused by movement of the piston 117, is controlled by the opening of the valve 134 in this by-pass.

Above the lug 127 is secured a detachable casing 141, defining, with the housing 112, a space which communicates with the upper guide bore 129. The shaft 123 projects into this space and is provided at its end therein with an upwardly disposed lever arm 142, which is preferably substantially equal in size to the arm 122. The end of the arm 142 is provided with a pin 143 on which is pivotally mounted a pendulum 144, the center of gravity of which is normally on the axis of the shaft 123. The upper end of this pendulum is pivotally connected, as at 146, to a link 147, the other end of which is pivoted as at 148 to the mid point or junction of a toggle having the arms 149 and 151. The upper end of the toggle arm 149 is pivotally mounted, as on a pin 152 to a lug or other suitable stationary abutment 153 on the casing 112. The lower end of the toggle arm 151 is pivotally connected, as at 154, with the upper end of the valve member 134 in any suitable way.

The operation of this mechanism will be evident. The lever arm 142 moves with the shaft 123, and has, at any given moment, a velocity and acceleration equal to the velocity and acceleration of the arm 122 and proportional to the velocity and acceleration of the vehicle spring. This arm carries with it the pendulum 144, which, by reason of its mass, has considerable inertia, so that it tends to lag behind the arm 142 during movement thereof in either direction, in a manner similar to that of the pendulums 36, 76 and 97, previously described in this specification. The friction of the valve guides 136 and 137 tends to keep the toggle arms 149 and 151 in a straight line, and if the acceleration of the arm 142 is low, then the inertia of the pendulum 144 is likewise low so that the link 147 will simply swing the pendulum on its pivot 146. If, however, the acceleration and inertia of the pendulum are sufficiently high, as upon a larger vehicle spring movement, sufficient force will be exerted on the toggle through the link 147 to move the toggle arms, or "break" the toggle, and this force, and hence the degree of movement of the toggle arms, is substantially proportional to the acceleration of the arm 142, and in turn of the vehicle spring 110. This movement of the toggle changes the position of the valve 134 so as to restrict the by-pass between the ends of the lower chamber to a greater or less degree. In this way, the resistance to flow of fluid through the by-pass, and consequently the damping effect of the shock absorber as a whole, is in proportion to the acceleration of the vehicle spring, in either direction, upon initial compression or upon rebound.

It will be evident that this invention provides means for the damping of vibratory disturbances which is very sensitive, and which is particularly efficient in that the degree of control is proportional to the acceleration of the moving parts. This acceleration bears the most direct and simple relation to the force causing the disturbance so that the disturbance is checked at its inception before it has time to reach any appreciable magnitude. In this way, the prevention of resonance, or the increase in the disturbance by sympathetic vibration, is secured.

It will be understood that various forms of the invention other than those described above may be used without departing from the spirit or scope of the invention.

What is claimed is:

1. A device for damping torsional vibration in rotating bodies comprising a pendulum mounted to rotate with the body and sensitive to rotational acceleration and deceleration therein, a mass mounted on said body to freely rotate independently thereof at substantially the same speed, and means actuated by the pendulum to connect the mass to the body upon any change in speed of the body.

2. A device for damping torsional vibration in rotating bodies comprising a support rigidly secured to the body, a pendulum mounted on the support having its center of gravity in the axis of rotation of the body, a mass mounted to rotate about the axis of rotation of the body independently of the body and at substantially the same speed and means actuated by the pendulum to yieldably connect the mass to the support upon an acceleration or deceleration of the body with respect to said mass.

3. A device for damping torsional vibration in rotating bodies comprising a support rigidly secured to the body, a pendulum mounted on the support having its center of gravity in the axis of rotation of the body, a pair of brake shoes pivotally mounted on the support to rotate therewith, a flywheel mounted to rotate about the axis of rotation independently of the body, and means actuated by the pendulum to engage the brake shoes with the flywheel.

4. A damping device for torsional vibration in a rotating body comprising a pendulum carried by said body and sensitive to changes of speed therein, an independent mass rotating at substantially the same speed, and means actuated by the pendulum to connect said mass to the body.

5. A damping device for torsional vibration in a body comprising means including a movable mass adapted to add to or subtract energy therefrom, and means controlling the action of said energy supplying means having a pendulum sensitive to acceleration and retardation of the body.

6. A device for damping torsional vibration in a rotating body comprising a pendulum mounted on said body to rotate therewith and having its center of gravity in the axis of rotation of the body, a flywheel mounted to rotate substantially at body speed about the axis of rotation of the body independently of said body, brake members pivotally mounted on the body to rotate therewith adapted to engage said flywheel, and means including a cam carried by the body and adapted to actuate the brake members upon oscillation of the said pendulum.

7. A device for damping torsional vibration in a rotating shaft comprising a disk rigidly secured to said shaft, a pendulum pivoted to said disk having its center of gravity in the axis of the shaft, a flywheel journaled on the shaft adjacent the disk to rotate freely with respect thereto, brake shoes mounted on the disk adapted to engage the flywheel, and a cam operable upon oscillation of the pendulum on its pivot to actuate the brake shoes.

8. A device for damping torsional vibration in a rotating shaft comprising a disk rigidly secured to said shaft, a pendulum pivoted to said disk having its center of gravity in the axis of the shaft, a flywheel journaled on the shaft adjacent the disk to rotate freely with respect thereto and having an axially disposed rim portion, brake shoes pivotally mounted on the disk adapted to expand into engagement with said rim portion, and a cam secured to and operated by the pivot of the pendulum adapted to expand the brake shoes upon oscillatory movement of said pendulum.

9. A device for damping torsional vibration in a body comprising a mass rotatable steadily at substantially body velocity, friction connecting means between said mass and body, and inertia means carried by the body operable to actuate said connecting means upon acceleration and retardation of said body.

10. A device for damping torsional vibration in a rotatable body comprising a mass rotatable steadily at substantially body velocity about the axis of rotation of the body means operable to connect said mass and body, and means carried by the body having its center of gravity normally on the axis of rotation, movable by its inertia to operate said connecting means upon acceleration and retardation of said body.

11. A device for damping torsional vibration in a rotating body comprising an independent mass adapted normally to rotate about the axis of rotation of the body, and at substantially the same speed, clutch means carried by the body adapted to connect the body to said mass, and inertia means carried by said body having its center of gravity normally on the axis of rotation, and sensitive to changes of velocity of the body to actuate said clutch means.

12. A device for damping torsional vibration in a body comprising a damping member having substantially constant momentum at any given speed, a clutch device adapted to transfer variable amounts of energy between the body and said member, and means including a member movable by its inertia to actuate said clutch device in proportion to the acceleration and retardation of said body.

13. A device for damping vibratory disturbances in a body comprising motion resisting means adjacent the body and engageable therewith, and inertia means carried by the body and operatively associated with the motion resisting means adapted to connect the body to said motion resisting means upon acceleration and deceleration of the body.

14. A device for damping torsional vibration in a rotating body comprising a member having a braking surface, shoes carried by the body adapted to frictionally engage the surface, a weight member pivotally carried by the body and sensitive to the acceleration and deceleration thereof, and means connecting the shoes and said weight member to govern the application of the shoes.

15. A device for controlling oscillatory vibration in a rotatable body comprising an inertia member movable relatively to said body in response to acceleration and deceleration of the body, a damper member associated with the body, and means operated by the inertia member to vary the effectiveness of the damper member on said body.

16. A device for controlling oscillatory disturbances in a rotatable body comprising a member to oppose said disturbances, an inertia member carried by the body and movable relatively thereto, and means operated by the inertia member to control the effectiveness of the opposing member.

17. A device for controlling oscillatory vibration in a body comprising an inertia member movably mounted on said body and sensitive to acceleration and deceleration thereof, an energy supplying or absorbing member, and means controlled by said inertia member to connect and release the energy member and the body.

18. A device for damping oscillatory disturbances in a body comprising a member having a kinetic energy potential, means for connecting and releasing said body and said member to transmit energy from the member to the body or vice-versa, and inertia means movable relatively to said body and responsive to acceleration and deceleration of the body controlling said connecting means.

In testimony whereof I affix my signature.

WALTER R. GRISWOLD.